United States Patent [19]

Kawamura

[11] Patent Number: 5,532,829
[45] Date of Patent: Jul. 2, 1996

[54] AUTOMATIC COLOR CONTROL CIRCUIT HAVING A CONTROL SIGNAL STORING CAPACITOR

[75] Inventor: Yasunori Kawamura, Kyoto-Fu, Japan

[73] Assignee: Rohm Co., Ltd., Kyoto, Japan

[21] Appl. No.: 412,855

[22] Filed: Mar. 29, 1995

Related U.S. Application Data

[63] Continuation of Ser. No. 860,781, Mar. 19, 1992, abandoned.

[30] Foreign Application Priority Data

Mar. 20, 1991 [JP] Japan .................................. 3-081513

[51] Int. Cl.[6] .............................. H04N 9/79; H04N 9/68
[52] U.S. Cl. ...................... 358/315; 358/310; 348/644; 348/705; 348/713
[58] Field of Search ...................................... 358/310, 312, 358/315, 316, 317; 348/571, 708, 643, 644, 645, 647, 705, 713; H04N 9/64, 9/79, 9/68

[56] References Cited

U.S. PATENT DOCUMENTS

| | | | |
|---|---|---|---|
| 3,789,162 | 1/1974 | Miyazaki | 360/63 |
| 3,947,871 | 3/1976 | Amari et al. | 358/315 |
| 4,417,284 | 11/1983 | Sato | 358/316 |
| 4,519,002 | 5/1985 | Amano | 358/335 |

FOREIGN PATENT DOCUMENTS 62-216596  9/1987  Japan .............................. H04N 9/79

*Primary Examiner*—Thai Q. Tran
*Assistant Examiner*—Khoi Truong
*Attorney, Agent, or Firm*—Nikaido, Marmelstein, Murray & Oram

[57] ABSTRACT

A control circuit includes: a capacitor for normal reproduction which stores an output of a reproduction color burst level detection for automatic color signal level control in a color signal processing circuit at the time of normal reproduction in a video cassette recorder; a capacitor for special reproduction which stores an output of a reproduction color burst level detection for automatic color signal level control at the time of special reproduction in the video cassette recorder; a switch for changing-over between outputs of the capacitors to supply a selected output to a gain variable amplifier for color signal amplification; and applying circuit for applying a voltage of the capacitor for special reproduction to the capacitor for normal reproduction at the time of special reproduction.

1 Claim, 8 Drawing Sheets

5,532,829

AUTOMATIC COLOR CONTROL CIRCUIT HAVING A CONTROL SIGNAL STORING CAPACITOR

This application is a continuation of application Ser. No. 07/860,781 filed Mar. 19, 1992, now abandoned.

BACKGROUND OF THE INVENTION

1. Field of the Invention

The present invention relates to a control circuit, and more particularly, to a control signal storing circuit for automatic color control (ACC) of video cassette recorders (VCR).

2. Description of the Prior Art

In ACC circuits for VCRs, as is conventionally known, two ACC control signal generating paths are provided which are associated with reproductions by two rotary heads since reproduction levels of the two rotary heads are different (see periods T1 and T2 in FIG. 2A). Outputs of the paths are alternately changed-over in synchronism with a changeover of the two heads and applied to a gain variable amplifier for color signal amplification. At this time, since a level detection output of an input color burst is supplied to a capacitor provided to each path for storing an output of a reproduction color burst level detection (the capacitor is included in a detection circuit) only every other field in correspondence to the changeover of the two heads, the capacitor is in a discharge state during the field period when no input signal is supplied to the capacitor (in other words, during a field period when an output of the capacitor is not used). Because of this, responsiveness deteriorates according to the amount of the discharge of potential when the next input signal is supplied to the capacitor.

Although no problems arise if the capacity of the capacitor is decreased to previously improve responsiveness, since a time constant is comparatively high to remove an effect by noise on a color signal in the color burst detection at the time of normal reproduction, the level of a color signal, which has been controlled by ACC signal, does not promptly reach a desired value at a, b, and c in FIG. 2B,—that is, immediately after the changeover by the head switch. The deterioration of responsiveness at the time of the changeover is more remarkable if the capacitor is discharged during the period when an output of the capacitor is not used.

To solve the above-described problem, Japanese laid-open Utility Model Application H2-53682 proposes that buffer on the output side of each capacitor is cut off during the period when an output of the capacitor is not used. That is, as shown in FIG. 1, in this prior art, to prevent the discharge of the capacitor, an output of a detection circuit 51 for level detection of a reproduction color burst of one (head A) of the two heads is charged into a capacitor 53 to be stored therein and an output of a detection circuit 52 for level detection of a reproduction color burst of the other head (head B) is charged into a capacitor 54 to be stored therein, and switches 57 and 58 are parallely provided between the collector and emitter of output emitter follower transistors (buffers) 55 and 56 connected to the capacitors 53 and 54. By the switches 57 and 58, an emitter follower transistor corresponding to a capacitor whose output is not used is disabled.

In this prior art, however, only discharge of the capacitors 53 and 54 through output paths of the capacitors 53 and 54 is prevented, and prevention of discharge of the capacitors 53 and 54 caused by a leak is not considered.

The discharge by a leak can be prevented if the capacities of the capacitors 53 and 54 are fairly increased. However, since it is impossible to take a high capacity value when the capacitors 53 and 54 are formed in an integrated circuit (IC), a decrease in voltage of the capacitors 53 and 54 caused by a leak is a considerable problem. This is a problem particularly when the capacitors 53 and 54 are OFF for a long time such as at the time of special reproduction.

At the time of special reproduction, a time constant for reproduction color burst level detection can be small since noise is ignored even if it is conspicuous. Therefore, a third capacitor is usually provided for storing level detection output of a color burst for special reproduction.

The discharge caused by a leak when a capacitor for storing a control signal is not used is a problem similarly in case of other electronic apparatuses and communication apparatuses as well as in the above-described case of VCRs.

SUMMARY OF THE INVENTION

An object of the present invention is to provide a control circuit designed so that a variation in control signal storing condition when a capacitor for storing a control signal is not used is prevented.

To achieve the above-mentioned object, a control circuit of the present invention is provided with: a first and a second control paths; a capacitor for storing a control signal and which is provided to each of said first and second control paths; a changeover switch for alternatively selecting between outputs of said capacitors to supply a selected output to said controlled portion; and means for applying an output of one capacitor to the other capacitor while an output of the former capacitor is being supplied to said controlled portion by said changeover switch.

According to such a feature, since the voltage value of a capacitor which is not used takes a value that is in accordance with an output of a capacitor which is used, when the un-used capacitor is used, the voltage thereof reaches a predetermined voltage for a short period of time compared with a case where the un-used capacitor is left in a discharge state as electric current leaks.

BRIEF DESCRIPTION OF THE DRAWINGS

This and other objects and features of this invention will become clear from the following description taken in conjunction with the preferred embodiments with reference to the accompanied drawings in which.

DESCRIPTION OF THE PREFERRED EMBODIMENTS

A control signal generating path for ACC of VCRs embodying the present invention will hereinafter be described.

Figure 3:
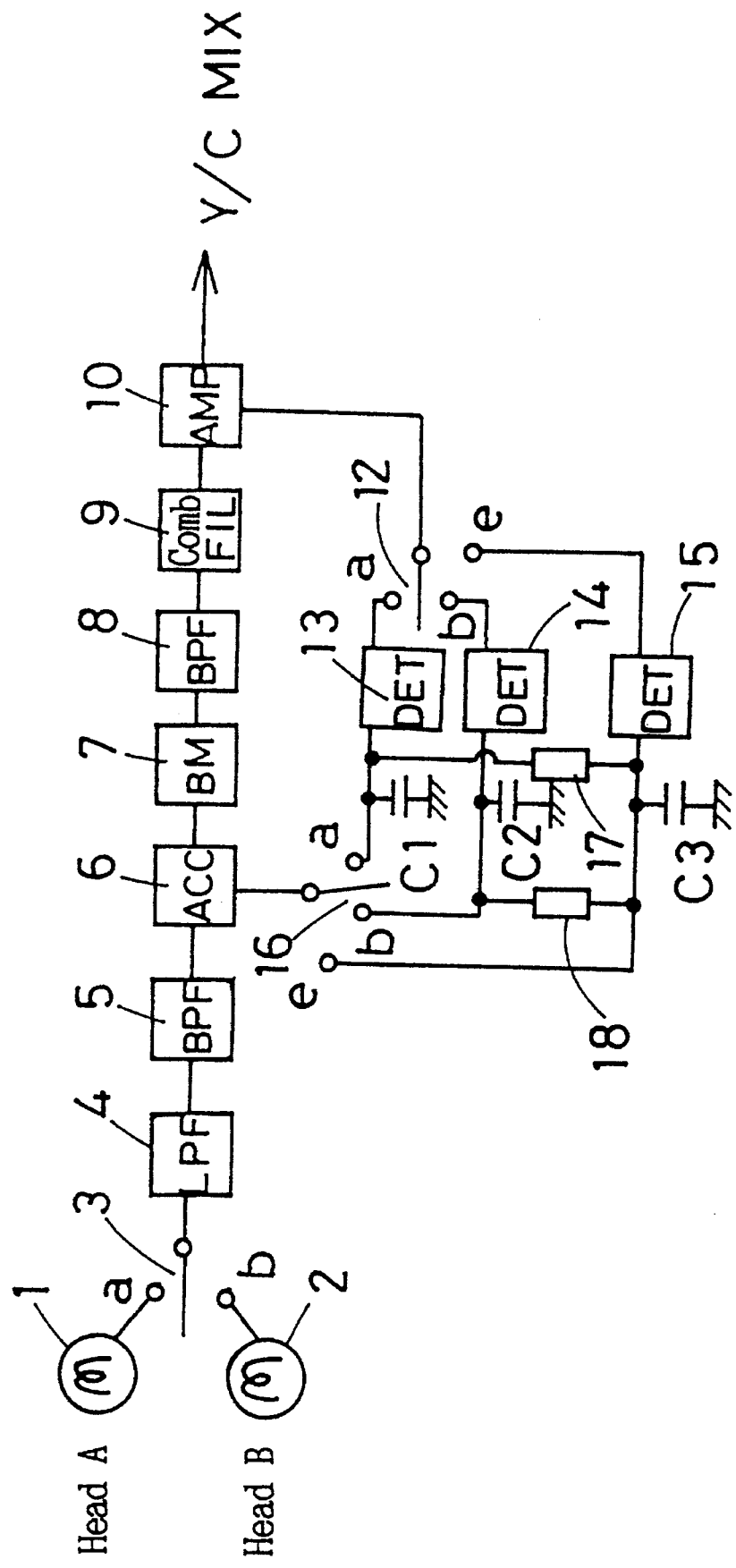
FIG. 3 is a block diagram of an ACC circuit of a VCR embodying a control circuit of the present invention.

FIG. 3 shows a color signal processing system of a VCR. A video signal reproduced every field alternately by a head A and a head B is seriated by a head changeover switch 3, and passes through a low pass filter 4. Thereafter, only a color signal is extracted from the video signal by a band pass filter 5 with a central frequency of 629 kHz. An output thereof is inputted to a gain variable amplifier 6. An output of the gain variable amplifier 6 is frequency-converted to a color signal with a carrier of 3.58 MHz at a balanced modulation circuit 7 on the next stage. After passing through a band pass filter 8 with a central frequency of 3.58 MHz and a comb filter 9, the signal is amplified by an amplifier 10. Thereafter, it is directed to a Y/C mixer to be combined with a luminance signal.

The gain variable amplifier 6 is gain-controlled so that the level of a color burst of a color signal outputted from the amplifier 10 is constant. For this reason, an output of the amplifier 10 is supplied to one of the color burst level detectors 13, 14, and 15 through a changeover switch 12 and thereafter supplied to a corresponding capacitor C1, C2, or C3. The capacitors C1, C2, and C3 are respectively included in the level detectors 13, 14, and 15. An output of the capacitors C1, C2, or C3 is supplied to the gain variable amplifier 6 through the switch 16. The capacitors C1 and C2 store a color burst level detection output of a reproduction output of the head A and the head B at the time of normal reproduction, whereas the capacitor C3 stores a reproduction color burst level detection output at the time of a special reproduction.

Although the capacitors C1 and C2 are formed in an IC, the capacity values thereof are comparatively high for noise cancellation. The capacitor C3 is also formed in an IC. However, the capacity value thereof is small since responsiveness is important to the special reproduction.

The switches 3, 12, and 16 are changed-over according to a changeover signal of the VCR. At the time of normal reproduction, the switches 3, 12, and 16 are changed-over to a contact point (a) at the time of a reproduction by the head A and to a contact point (b) at the time of a reproduction by the head B. On the other hand, at the time of special reproduction, the switches 12 and 16 are set to a contact point (e), and the switch 3 is set to either of the contact points (a) and (b) or alternately to the contact points (a) and (b).

Figure 4:
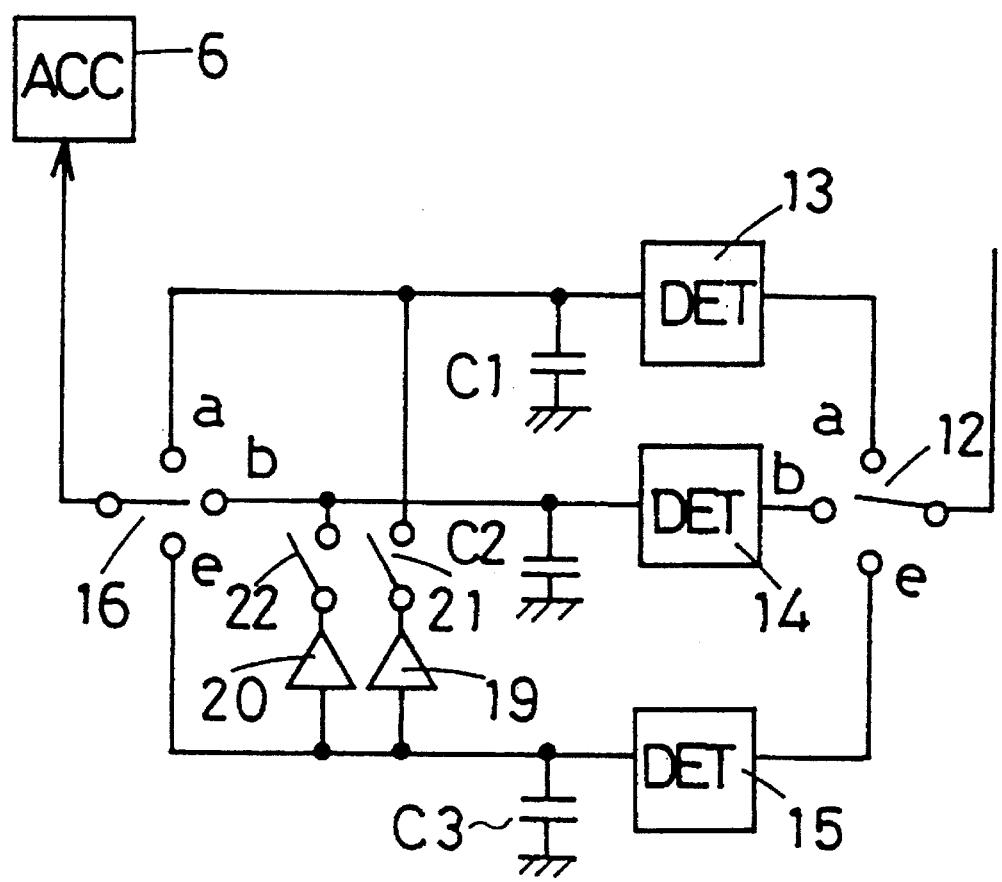
FIG. 4 is a view showing the details of the control circuit.

The numerals 17 and 18 are means for connecting the capacitor C3 to the capacitors C1 and C2 at the time of special reproduction, and as shown in FIG. 4, consists of buffers 19 and 20, and switches 21 and 22. In this embodiment, the switches 21 and 22 are ON only at the time of special reproduction. Hence, at the time of special reproduction, the voltage of both ends of the capacitor C3 is applied to the capacitor C1 through the buffer 19 and the switch 21 and to the capacitor C2 through the buffer 20 and the switch 22. A slight decrease in voltage due to the buffer 19 and 20 and switches 21 and 22 does not matter. In that case, the voltages at both ends of the capacitors C1 and C2 are maintained at the decreased voltage value.

Generally, a long period of time is required for a still reproduction and a rapid reproduction. Even if a leak occurs in the un-used capacitor C1 or C2 during the period, an undesirable decrease in voltage is not caused in the capacitors C1 or C2 since the capacitor C3 which is operating backs up the capacitors C1 and C2.

Figure 5:
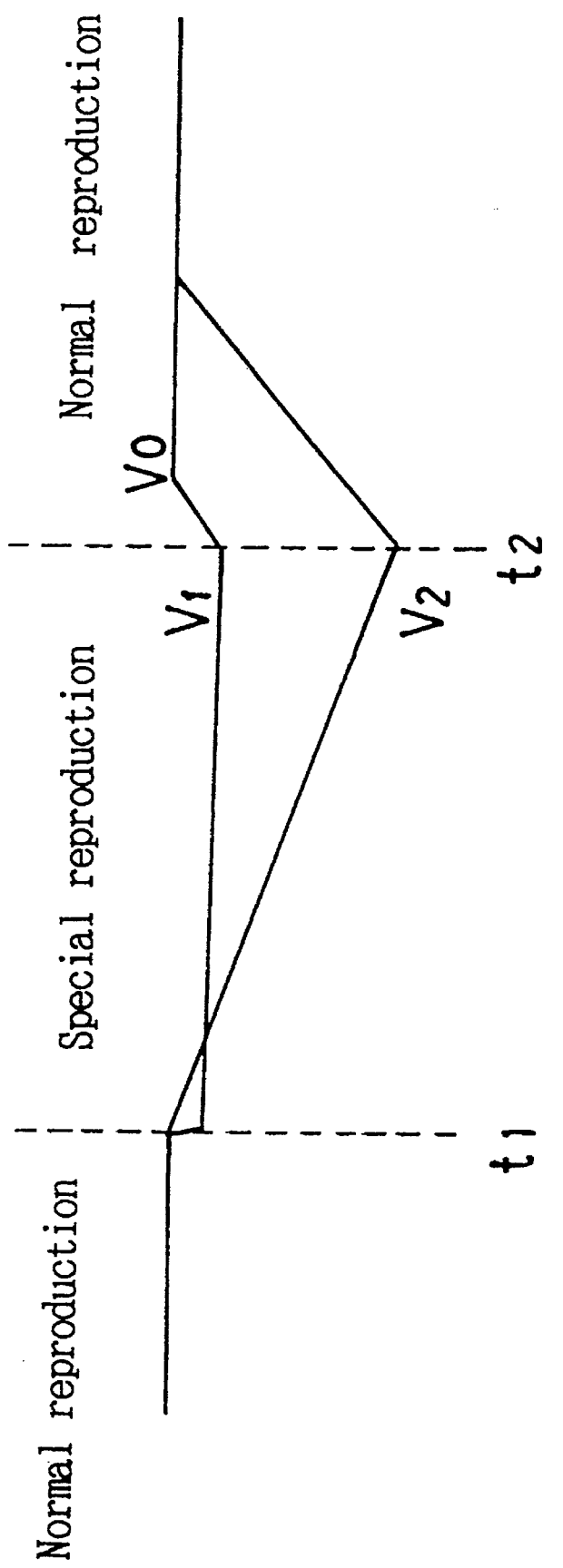
FIG. 5 is a view for explaining an operation of the present invention.

Therefore, as shown in FIG. 5, since the voltage of the capacitors C1 and C2 is maintained at a voltage V1 equal to that of the capacitor C3 for special reproduction when the mode is switched from the normal reproduction mode to the special reproduction mode at t1, when the mode is switched to the normal reproduction mode it takes only a short period of time of approximately 10 ps that the voltages of the capacitors C1 and C2 return to a voltage V0. The voltage V0 is the voltage of the capacitors C1 and C2 at the time of normal reproduction. On the contrary, in case of a prior art where the voltages of the capacitors C1 and C2 are left irrelevant to the voltage of the capacitor C3 for special reproduction at the time of reproduction, the voltage value of the capacitors C1 and C2 decrease to a voltage V2 due to a leak when the mode is switched from the normal reproduction mode to the special reproduction mode at t1. Because of this, it takes a long period of time of 50 ms that the voltages of the capacitors C1 and C2 return to the voltage V0 when the mode is switched to the normal mode. This means that according to the prior art, an image where color seems to disappear is obtained immediately after t2. According to the present invention, such a problem does not arise.

Next, an arrangement of the present invention will specifically be described with reference to FIG. 6. In the figure, transistors Q1 to Q5 and a constant current source 24 constitute the level detector 13. Transistors Q7 to Q11 and a constant current source 25 constitute the level detector 14. Transistors Q13 to Q17 and a constant current source 26 constitute the level detector 15.

The color signal amplified by the amplifier 10 is inputted to the level detectors 13, 14, and 15 through lines 31 and 32 as well as directed to an output terminal 30. At this time, the signals passing through the lines 31 and 32 are of differential form.

To a terminal 33, a burst gate pulse (BGP) is supplied. The BGP is applied to switches 12a, 12b, and 12c, which constitute the switch 12 shown in FIG. 3. The switches 12a, 12b, and 12c consist of transistor circuits, and are designed so as to be actuated only during a BGP duration while ON signals are being supplied from a control circuit 11. Outputs of the capacitors C1, C2, and C3 are provided to the switch 16 from the emitters of the emitter follower transistors Q6, Q12, and Q18, and only the output selected by the switch 16 is supplied to the gain variable amplifier 6 through a direct current amplifier (buffer) 29.

Figure 1:
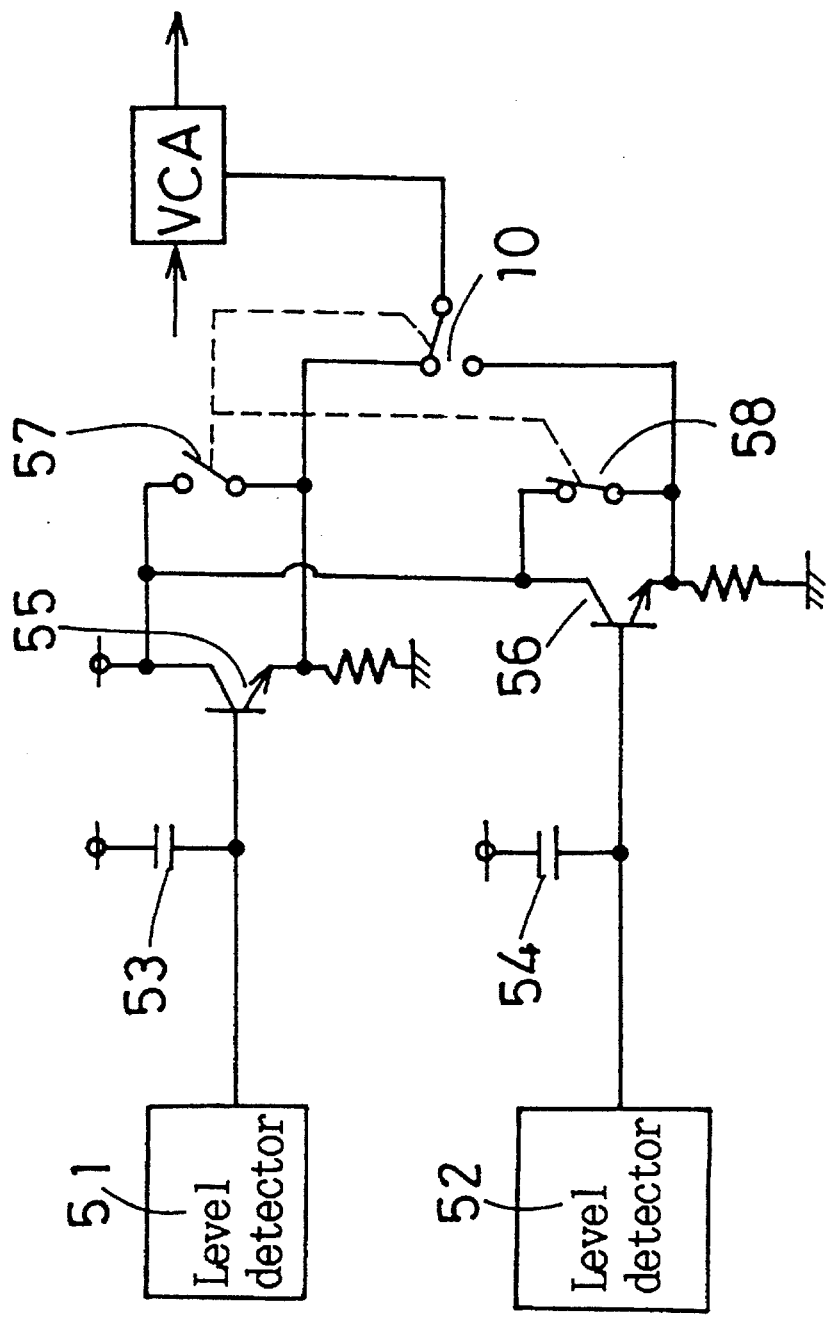
FIG. 1 is a circuit diagram showing the arrangement of a conventional control circuit.
Figure 2A:
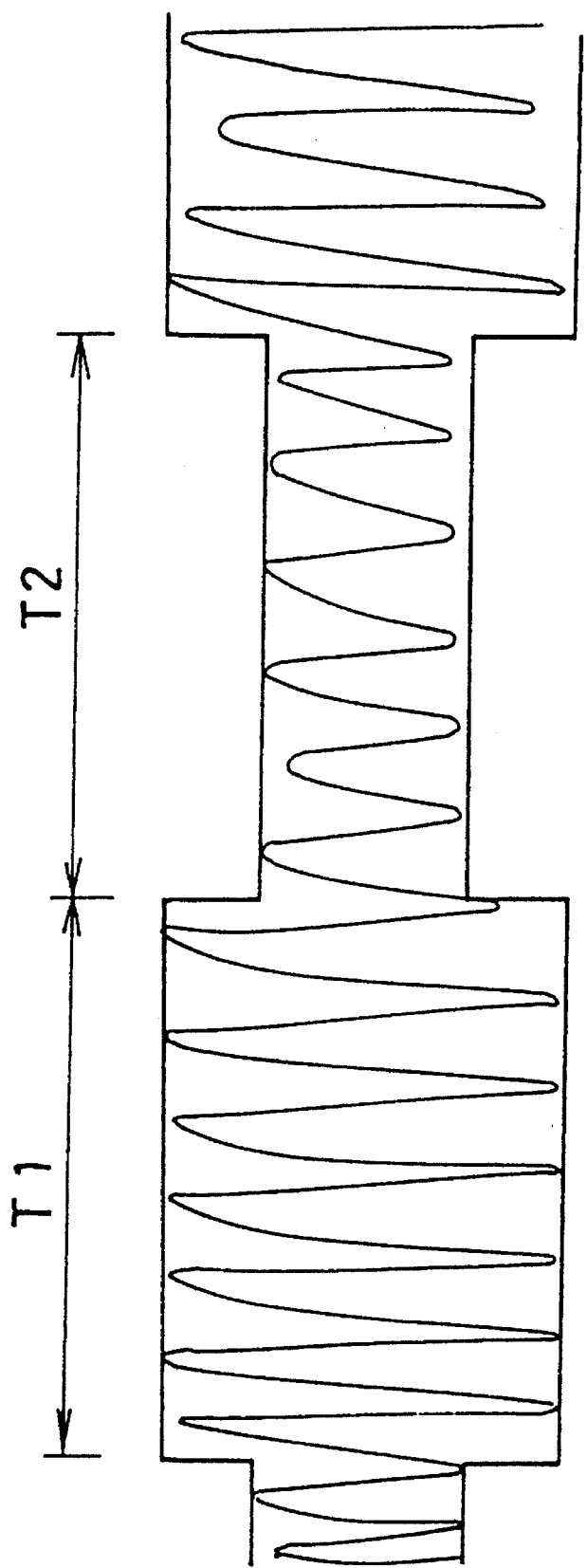
FIG. 2A is a view showing that the level of a video signal reproduced alternately by two rotation heads of a VCR varies.
Figure 2B:
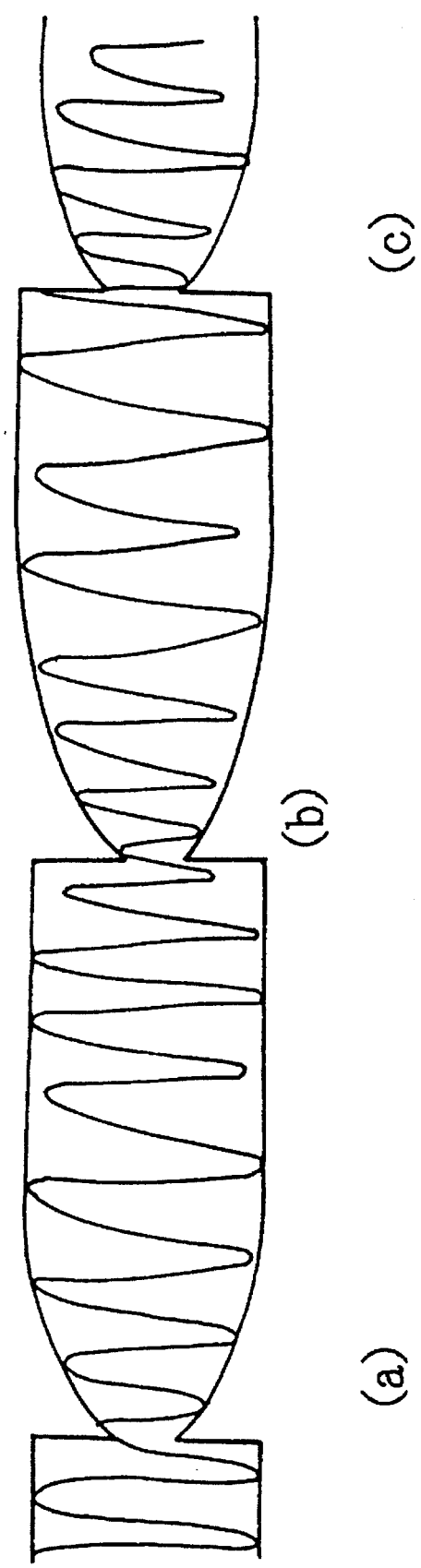
FIG. 2B is a view showing that the level of a color signal being controlled by ACC signal does not reach a desired value immediately after changeover of the two rotation heads in a VCR employing the conventional control circuit.

Switches 27, 28, and 29 are parallely connected between the collectors and emitters of the emitter follower transistors Q6, Q12, and Q18. Similarly to the switches 57 and 58 of the prior art shown in FIG. 1, these switches 27, 28, and 29 are used for preventing the charges of the capacitors C1, C2, and C3 from discharging through the emitter follower transistors Q6, Q12, and Q18 when the outputs of the capacitors C1, C2, and C3 are not used.

Transistors Q19 and Q20, and constant current sources 35 and 36 constitute the buffer 19. Transistors Q21 and Q22, and constant current source 37 and 38 constitute the buffer 20. Moreover, switches 21A and 21B, and switches 22A and 22B respectively constitute the switch 21 and switch 22 shown in FIG. 4.

Figure 6:
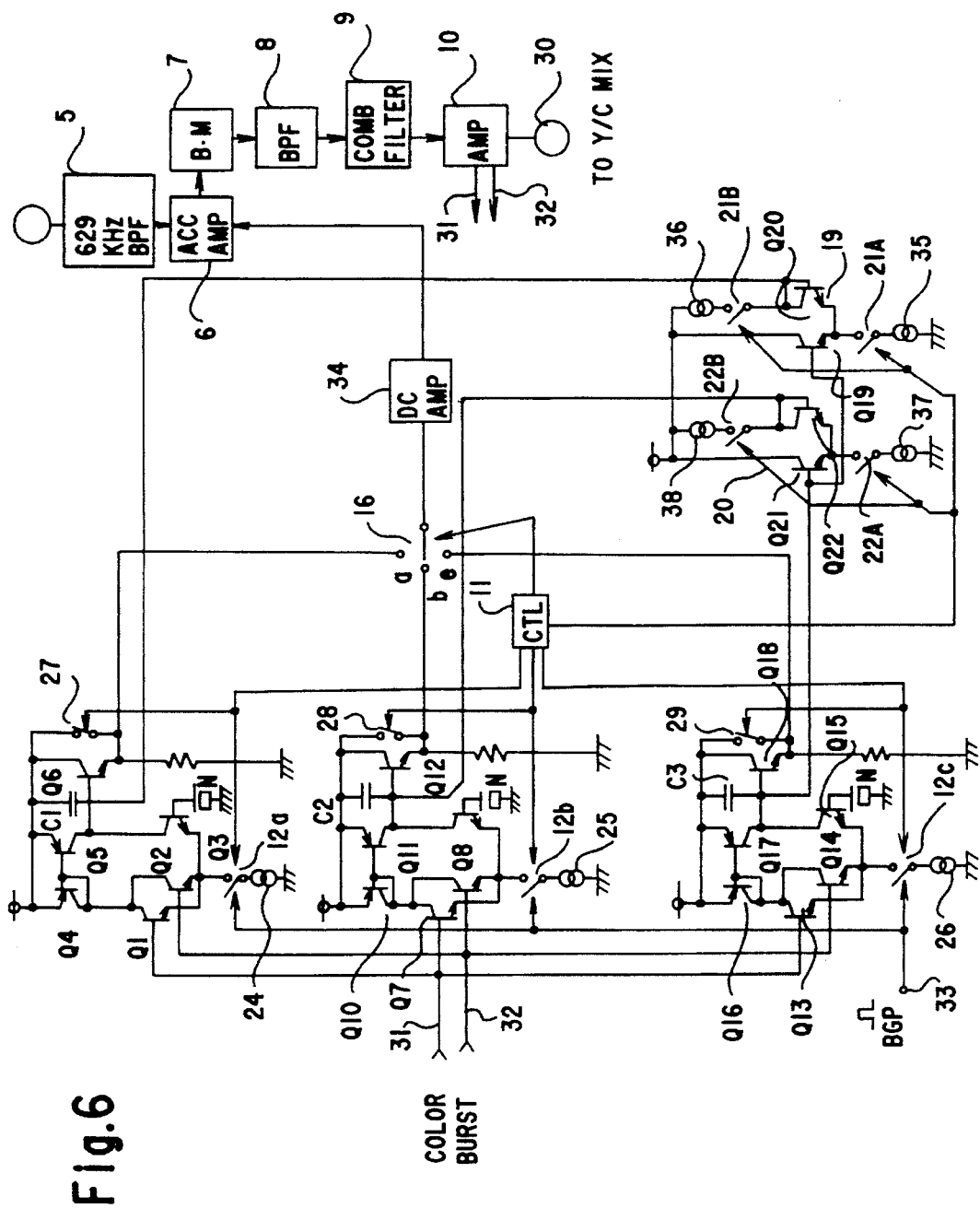
FIG. 6 is a view specifically showing the arrangement of a control signal path of the control circuit.

In FIG. 6, at the time of normal reproduction, the switch 29 is ON, whereas switches 12c, 21A, 21B, 22A, and 22B are OFF. The switches 12a, 12b, 27, and 28 alternate between ON and OFF in response to a changeover between the heads A and B. That is, the switches 12a and 28 are ON and the switches 12b and 27 are OFF when a reproduction output of the head A is processed, whereas the switches 12a and 28 are OFF and the switches 12b and 27 are ON when a reproduction output of the head B is processed. At this time, the switch 16 is changed-over alternately between the contact points (a) and (b). Needless to say, the switches 12a and 12b are ON only during the BGP duration.

At the time of special reproduction, the switches 12c, 21A, 21B, 22A, 22B, 27, and 28 are ON, and the switches 12a, 12b, and 29 are OFF. The switch 16 is set to the contact point (e).

A color burst included in a color signal inputted through the lines 31 and 32 at the time of special reproduction is full-wave-rectified by the transistors Q13 and Q14. A rectification output thereof is stored in the capacitor C3, and applied to the capacitor C1 from the base of the transistor Q19 through the collector of the transistor Q20 and to the capacitor C2 from the base of the transistor Q21 through the collector of the transistor Q22 as well as supplied to the gain variable amplifier 6 via the transistor Q18, the switch 16 and a direct current amplifier 34. Thereby, the potentials of the capacitors C1 and C2 are maintained equal to that of the capacitor C3.

When the mode is switched to the normal reproduction mode, the capacitors C1 and C2 are cut off from the capacitor C3 since the switches 21A, 21B, 22A, and 22B are turned off. Consequently, the capacitors C1 and C2 are not influenced by the capacitor C3.

The voltage of the capacitor C3 gradually decreases due to a leak at the time of normal reproduction since the capacitor C3 is not designed to be backed up by the capacitors C1 and C2. However, this does not matter since the capacitor C3, whose capacity value is small as mentioned above and where the time constant of the level detector 15 is small, is highly responsive to a change in the level of a color burst caused when the mode is switched to the special reproduction mode.

In the above-described embodiment, the present invention is applied to a relationship, in a VCR, between the capacitors C1 and C2 for normal reproduction which store a reproduction color burst level detection output for ACC at the time of normal reproduction and the capacitor C3 for special reproduction which stores a reproduction color burst level detection output for ACC at the time of special reproduction. The present invention can be applied not only to the above relationship but also to a capacitor, for storing a control signal, provided to each of a first and a second control paths in a control circuit where a control signal is supplied to one controlled portion alternatively from the first and second control paths.

Figure 7:
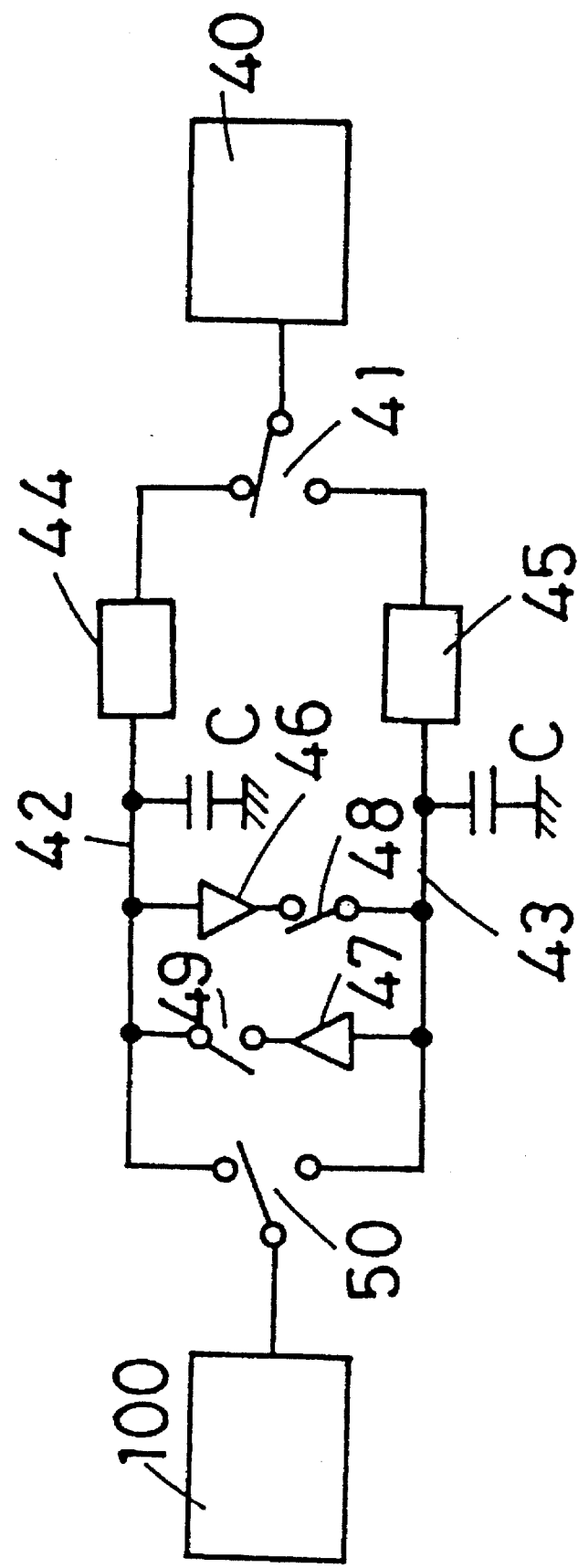
FIG. 7 is a view showing a main portion of a control circuit which is another embodiment of the present invention.

FIG. 7 shows an arrangement of the above-mentioned control circuit. As shown in the figure, a first and a second control paths 42 and 43 which supply a control signal to a controlled portion 100 are provided with control signal generating circuits 44 and 45 for generating control signal based on a signal provided from a signal source 40 through a switch 41, capacitors C4 and C5 for storing outputs of the first and second control signal generating circuits 44 and 45, and buffers 46 and 47 and switches 48 and 49 for supplying an output of one capacitor to the other capacitor when an output of the latter capacitor is not used. A switch 50 provided on the output side is changed-over interlocking with a changeover of the switch 41.

According to the embodiment shown in FIG. 7, not only the advantage the same as that of the embodiment described with reference to FIGS. 3 to 6 is obtained but also prevention of voltage decrease due to a leak is considered with respect to both of the capacitors. That is, whether the un-used capacitor is the capacitor C4 or the capacitor C5, an output of the capacitor which is not used is provided to the other capacitor which is operating.

According to one feature of the present invention, as described above, since the voltage value of a capacitor which is not used takes a value that is in accordance with an output of a capacitor which is used, when the un-used capacitor is used, the voltage thereof reaches a predetermined voltage for a short period of time compared with a case where the un-used capacitor is left discharge state as electric current leaks.

According to another feature of the present invention, as described above, a capacitor for since normal reproduction which is not used at the time of special reproduction is backed up by an output of a capacitor for special reproduction in a VCR, a change in voltage due to a leak does not occur, therefore a disadvantage is prevented that color disappears from an image when the mode is switched to the normal reproduction mode.

Obviously, many modifications and variations of the present invention are possible in light of the above teachings. It is therefore to be understood that within the scope of the appended claims, the invention may be practiced other than as specifically described.

What is claimed is:

1. A control circuit in a video cassette recorder, comprising:
   a first capacitor which stores a level detection signal of a color burst signal in a color signal reproduced by a first rotation head for automatic color signal level control at a time of normal reproduction;
   a second capacitor which stores a level detection signal of a color burst signal in a color signal reproduced by a second rotation head for automatic color signal level control at the time of normal reproduction;
   a third capacitor for special reproduction which stores a level detection signal of a reproduction color burst signal for automatic color signal level control at a time of special reproduction;
   a first switch which operates to provide a color burst level detection signal to said first capacitor and said second capacitor alternately every field at the time of normal reproduction, said first switch operating to provide the color burst level detection signal only to said third capacitor at the time of special reproduction;
   a second switch which provides to a gain variable amplifier for color signal amplification an output of said first capacitor and an output of said second capacitor alternately every field at the time of normal reproduction, said second switch providing an output of said third capacitor to the gain variable amplifier at the time of special reproduction; and
   applying means for applying a voltage of said third capacitor to said first and second capacitors at the time of special reproduction, said applying means being activated/deactivated by a normal/special reproduction change-over signal.

* * * * *